United States Patent Office 2,933,969
Patented Apr. 26, 1960

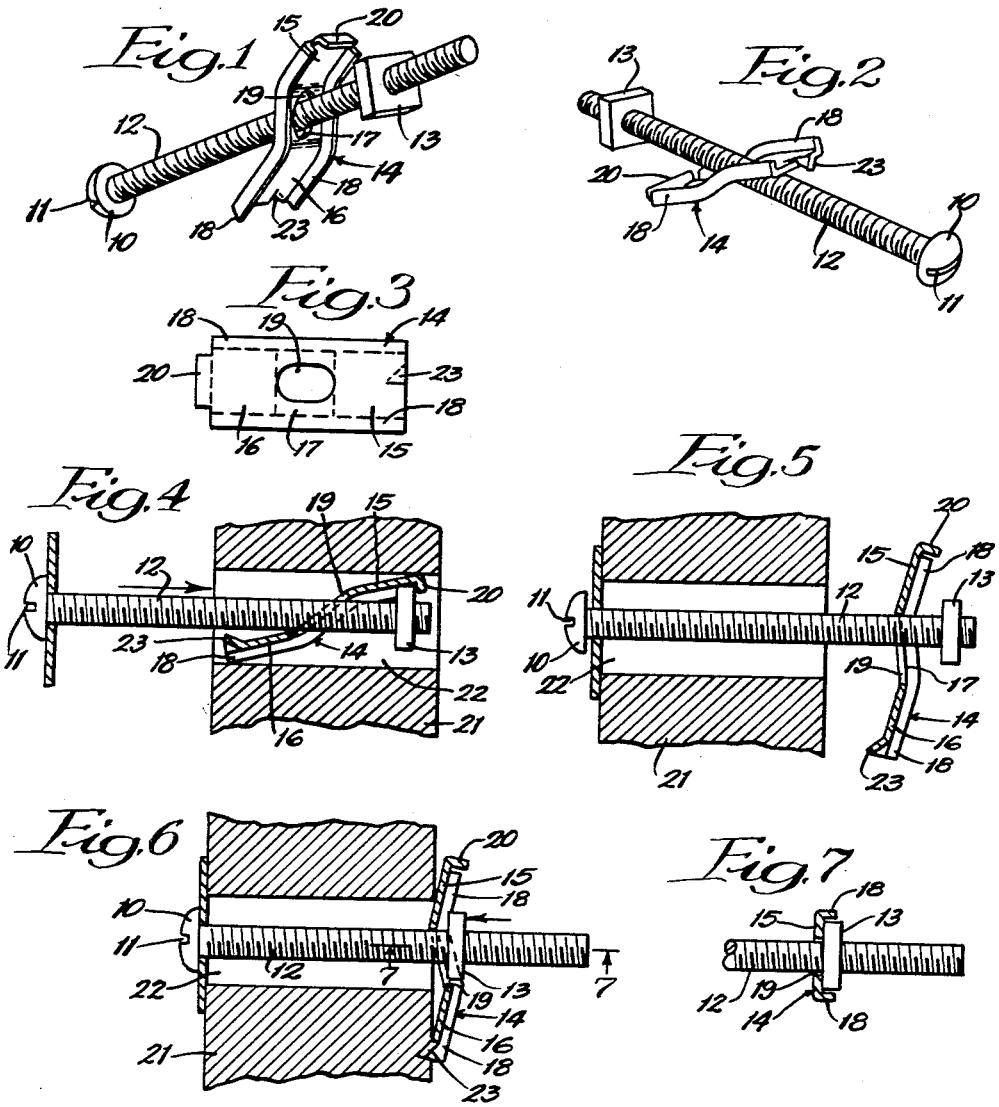

2,933,969

S-SHAPED TOGGLE CLAMP WITH INTURNED SIDE FLANGES TO PREVENT NUT FROM ROTATING

Phillip H. Huyssen, La Grange, Ill.

Application February 6, 1956, Serial No. 563,488

3 Claims. (Cl. 85—3)

This invention relates to an anchor bolt, and more particularly to a toggle bolt or anchorage device in which an anchor head is employed with a bolt for securing the same within a hole in a wall, ceiling, etc., for securing electric fixtures or parts thereto.

Anchor bolts of many types have been employed, including both complicated and simple structures, but, in main, these have been unsatisfactory because of lack of strength, cost of structure, difficulty of application, etc. There has long been a need for an extremely simple and inexpensive form of toggle bolt or anchor bolt which can be readily applied while at the same time providing a high degree of holding strength when placed within a wall and drawn tightly to secure a fixture or other device against the wall.

An object of the present invention is to provide a bolt of the character described and having the advantages set forth. A further object is to provide an anchor bolt structure of extremely simple design which is effective for carrying a very high load when secured within a wall opening. A still further object is to provide such an anchor bolt structure which may be readily placed in position and the parts drawn tight within a wall opening to provide a support of great rigidity and strength. Other specific objects and advantages will appear as the specification proceeds.

The invention is shown, in an illustrative embodiment, by the accompanying drawing, in which—

Figure 1 is a perspective view of an anchor bolt structure embodying my invention; Fig. 2, a perspective view of the structure taken from a different angle; Fig. 3, a top plan view; Fig. 4, a longitudinal sectional view showing the structure applied to a wall opening; Fig. 5, a view similar to Fig. 4 showing the second step in the attachment operation in which the anchor bar swings freely upon the bolt on the inner side of the wall; Fig. 6, a view similar to Fig. 4 but showing the anchor bolt in secured position; and Fig. 7, a sectional detail view showing the nut held between the internal flanges of the anchor head.

In the illustration given, 10 designates a bolt head provided with a slot 11, and 12 designates the shank or threaded portion of the bolt. A square nut 13 threadedly engages the bolt portion 12.

Mounted upon the shank portion 12 of the bolt is the anchor head 14. The anchor head or bar 14 comprises a body portion lying in three planes. There is an end planar portion 15 lying in one plane and another end portion 16 lying in a different plane, and an inclined central portion 17 connecting the end planar portions 15 and 16. The member 14 has longitudinally-extending inturned flanges 18 which extend the length of the body and which face inwardly with their raw edges exposed on the inner side of the structure. The two flanges 18 serve as supporting beams which greatly strengthen the body structure throughout its length, and the flanges 18 are bent into the same planar positions as the sections 15, 16 and 17.

In the inclined intermediate body wall 17 I form an elongated opening 19 for loosely receiving the bolt shank 12. At one end of the member 14 I provide an inturned end flange 20 which is adapted to receive the nut 13, as illustrated in Fig. 4, and to be retained thereon as the bolt is inserted through a wall opening. In the illustration given, the wall is designated by the numeral 21, and the opening therethrough is designated by the numeral 22.

The end of the member 14 opposite the inturned flange 20 may be provided with an outwardly struck segment forming a tooth 23, as shown best in Figs. 5 and 6.

Operation

In the operation of the structure, the anchor head 14 is placed upon the bolt shank 12 and the nut 13 is threaded upon the end of the bolt, as illustrated in Figs. 1 and 2. The forward flange 20 may then be placed about the nut 13, as illustrated in Fig. 4, and with the structure shown, it is found that the retaining flanges 18 and 20 cause the head to remain upon the nut 13 and bolt shank 12 as the shank is introduced through the opening 22 of the wall 21. When the bolt has been extended far enough through the opening so as to allow the anchor head 14 to clear the opening, the off-center mounting of the anchor head 14 causes it to assume the position shown in Fig. 5. As the bolt is drawn outwardly and the anchor head is drawn against the inner side of the wall, rotation of the bolt causes the nut to press against the member 14, rotation being prevented by the flanges of the member 14, and the anchor head is tightly secured in position, as illustrated in Fig. 6.

The offset body structure illustrated in the drawings gives a resilient or spring-like action in the anchoring of the bolt, while at the same time this structure retains its unusual strength by reason of the longitudinally-extending flanges 18 which parallel throughout the positions of the planar portions 15, 16 and 17. At the same time, the side flanges 18 restrain the nut 13 against rotation in the tightening operation, and the flanges 18 and 20 also provide a holding means for supporting the anchor head upon the nut 13 during the insertion operation. The offset relation of the planar portions allows the anchor bar 14 to lie in a position close against opposite sides of the bolt 12, as illustrated in Fig. 4, with the flanges 18 enclosing the nut 13, and such flanges, in the tightened position shown in Fig. 6, provide the great strength which is required of the anchoring device, distributing the stress against the inner surfaces of the wall while at the same time providing a resilience by reason of the bowed shape of the anchor head.

While I prefer to form the anchor head from a single bar of metal, as illustrated in the drawings, it will be understood that a wire frame having the same characteristics may be employed, the frame being generally in the S-shaped design illustrated, providing the ring or loop at an inclination in the intermediate portion of the device and providing offset planar end portions, etc.

While, in the foregoing specification, I have set forth a specific structure in considerable detail for the purpose of illustrating an embodiment of the invention, it will be understood that such details of structure may be varied widely by those skilled in the art without departing from the spirit of my invention.

I claim:

1. In combination with a threaded bolt having a head at one end and having a square nut threadedly carried at the opposite end thereof, an elongated S-shaped anchor head adjacent said nut having a generally U-shaped cross-section and having a pair of end portions in offset planar relation, said anchor head also having a planar intermediate portion interposed between said offset end portions and continuous therewith, said end portions having flat surfaces facing in the general direction of the head of said bolt, said flat surfaces being disposed in offset planar relation and being adapted to bear against a wall surface at acute angles with reference thereto, said intermediate portion being provided with an elongated opening therethrough receiving the shank of said bolt for pivotal movement of said anchor head about a line transverse to the axis of said bolt, said anchor head having a pair of parallel side flanges facing in the same direction toward said nut and extending along substantially the entire length of said anchor head, said side flanges receiving therebetween said nut and engaging the sides of the same to prevent independent relative rotation of the nut and anchor head upon said threaded bolt, and said planar intermediate portion being angularly disposed relative to a surface abutted by said head and being tensioned when the nut is drawn tightly thereagainst.

2. In combination with a threaded bolt having at one end a head and at the other end a square nut and being adapted to extend through a wall opening with said head and nut at opposite sides of said wall, an anchor head carried by said bolt adjacent said nut and comprising an elongated flexible S-shaped body having end portions providing flat bearing surfaces in offset planar relation, said bearing surfaces facing in the general direction of said bolt head and being adapted to engage a wall surface at acute angles with reference thereto, said body also having an intermediate connecting portion between said end portions and continuous therewith, said connecting portion being provided with an elongated opening receiving the threaded portion of said bolt and permitting said anchor head to be swung into a position in general longitudinal alignment with said bolt while also being swingable, when released, into a vertical suspended position upon said bolt, said anchor head being provided with side flanges extending along the sides of said end and connecting portions and facing in the direction of said nut, said flanges being adapted to snugly engage the sides of said nut to restrain the same against rotation when said anchor head is suspended in vertical position, said connecting portion being angularly disposed relative to a surface abutted by said anchor head and relative to the axis of said bolt when said anchor head is in vertical position, said end and intermediate portions of said body being capable of flexing under tension when said anchor head is urged tightly against a wall surface.

3. In combination with a threaded bolt having a head at one end thereof and being provided at its opposite end with a threaded portion receiving a square nut, said bolt being adapted to extend through an opening in a wall with said head and nut at opposite sides of said wall, an anchor head carried by said bolt adjacent said nut and comprising an elongated body having end portions providing flat bearing surfaces in offset planar relation, said bearing surfaces facing in the general direction of said bolt head and being adapted to engage a wall surface at acute angles with reference thereto, said body also having an intermediate connecting portion extending between said end portions and continuous therewith, said connecting portion being provided with an elongated slot receiving an intermediate portion of said threaded bolt, said intermediate and end portions having a pair of parallel inturned side flanges facing said nut and adapted to engage the sides of said nut to prevent relative rotation of said nut and anchor head, at least one of said end portions being provided with an inturned end flange adapted to engage a face portion of said nut, said connecting portion being angularly disposed with reference to a wall surface engaged by said end portions and with reference to the axis of said bolt, said anchor head being capable of flexing under tension when the same is urged tightly against a wall surface upon tightening of said bolt.

References Cited in the file of this patent

UNITED STATES PATENTS

| 549,069 | Lever | Oct. 29, 1895 |
| 1,167,577 | McCain | Jan. 11, 1916 |
| 1,792,974 | Gerry | Feb. 17, 1931 |
| 2,439,364 | King | Apr. 6, 1948 |
| 2,532,040 | Seely | Nov. 28, 1950 |

FOREIGN PATENTS

| 591,949 | Great Britain | Sept. 3, 1947 |
| 600,116 | Great Britain | Mar. 31, 1948 |